(12) United States Patent
Nimberger (10) Patent No.: US 8,365,769 B2
(45) Date of Patent: Feb. 5, 2013

(54) BALL VALVE

(75) Inventor: Spencer Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 530 days.

(21) Appl. No.: 12/348,977

(22) Filed: Jan. 6, 2009

(65) Prior Publication Data

US 2010/0170585 A1   Jul. 8, 2010

(51) Int. Cl.
   F16L 37/30   (2006.01)
   F16L 37/23   (2006.01)
   F16L 37/10   (2006.01)
   F16L 37/14   (2006.01)
   F16K 1/30    (2006.01)
   F16K 29/00   (2006.01)
   E03B 1/00    (2006.01)

(52) U.S. Cl. ............... 137/614.06; 137/614; 137/614.2; 251/148; 285/404; 285/388

(58) Field of Classification Search .......... 251/151, 251/148; 137/614, 614.2, 613, 614.01, 614.06; 285/90, 91, 404, 386–389

See application file for complete search history.

(56) References Cited

U.S. PATENT DOCUMENTS

| | | | | |
|---|---|---|---|---|
| 1,927,448 A * | 9/1933 | Terry | .......................... | 251/149.9 |
| 2,151,833 A * | 3/1939 | Bugatti | .......................... | 285/271 |
| 2,372,820 A * | 4/1945 | Gardes | .......................... | 137/269 |
| 2,525,652 A * | 10/1950 | Cuningham | .................. | 285/281 |
| 3,491,796 A * | 1/1970 | Scaramucci | ............... | 137/614.2 |
| 4,023,773 A | 5/1977 | Wise | | |
| 4,124,036 A | 11/1978 | Rogers | | |
| 4,422,472 A * | 12/1983 | Klein | ........................ | 137/614.06 |
| 4,458,878 A * | 7/1984 | Tsuno | .......................... | 251/152 |
| 5,255,121 A | 10/1993 | Suzuki | | |
| 5,383,492 A * | 1/1995 | Segal | ........................ | 137/614.06 |
| 5,915,402 A * | 6/1999 | Mitchell, II | ................ | 137/15.09 |
| 6,056,012 A | 5/2000 | Yuen et al. | | |
| 6,098,659 A * | 8/2000 | Mannis | ........................ | 137/614.2 |
| 6,155,295 A | 12/2000 | Nimberger | | |
| 6,237,633 B1 | 5/2001 | Nimberger | | |
| 6,634,312 B2 * | 10/2003 | Warner et al. | ................. | 114/197 |

\* cited by examiner

*Primary Examiner* — Stephen M Hepperle
*Assistant Examiner* — Jonathan Waddy
(74) *Attorney, Agent, or Firm* — Streets & Steele (57) ABSTRACT

A ball valve is provided for threaded connection to a separable component 72 having male threads 74. A housing 10 contains a ball 12 selectively rotatable for passing fluid through the housing, and a flange member 20 threadably secured to the valve housing. A stop ring 16 is positioned outward of the valve housing and engages the flange member. A coupling 20 is threadably secured to the stop ring and includes female threads for engagement with male threads on the separable component.

15 Claims, 7 Drawing Sheets

BALL VALVE

FIELD OF THE INVENTION

The present invention relates generally to a fluid disconnect system for use with a ball valve. More particularly, this invention relates to a ball valve which may reduce the amount of trapped fluid that is vented during a disconnect operation. The invention also relates to a ball valve with a minimum restriction to the flowing fluid and adaptability to an industry standard connection.

BACKGROUND OF THE INVENTION

Fluid connections in flow lines are commonly used in the transportation and distribution of products, such as propane and anhydrous ammonia. These fluids, when vented to atmosphere, are regarded as harmful to the environment. It is thus desirable to minimize the amount of liquid that is trapped in a connection upon closure of the upstream and downstream valves. U.S. Pat. Nos. 6,237,633 and 6,155,295 discloses an improved flow connect system that minimized the release of product during a disconnect operation. The system includes an inlet ball valve member with it's outlet port configured as an industry standard male acme connection and a downstream check valve with it's inlet port configured as an industry standard female acme "hammer union" type connection. While this system provided for minimal flow restriction and minimal release of trapped liquid upon disconnect, it failed to address the industry standard of a male acme connection at the inlet port of the downstream valve.

With the configuration of '663 Patent, the user would have to convert a fleet of vehicles using the patented system because once the upstream valve was converted to the male acme configuration, it would no longer connect to the normally configured male acme connection in the vehicle fleet. Other patents disclosing ball valve disconnect systems include U.S. Pat. Nos. 4,023,773, 4,124,036, 5,255,121 and 6,056,012.

In various applications, it is thus desirable to use a ball valve for the upstream valve for flow considerations, but to have its outlet port configured with a female acme connection. In this situation, the filling station could still connect to and fill a truck outfitted with the industry standard male acme connection, although the released product at disconnect would be greater than if the vehicle were outfitted with a check valve that minimized the product release. With this setup, the fleet of transport vehicles can be converted gradually to reduced release downstream check valves while allowing the filling operation to connect to all the vehicles in the fleet.

The disadvantages of the prior art are overcome by the present invention, and an improved ball valve for threaded interconnection to a separable component having a male thread is hereinafter disclosed.

SUMMARY OF THE INVENTION

A ball valve is adapted at its outlet port with a flange member that provides the downstream ball seal functionality and provides a thrust surface for a two piece female coupling, such as a hammer union. In one embodiment, prior to fixing the flange member in place, a stop ring is positioned over the downstream end of the ball valve, such that it will be upstream of the flange member once connected. A locking member secures the ball valve housing or body and the flange member, and a pressure seal between the main body and the flange member isolate the ball valve internal pressure. An internally threaded coupling, such as a female acme hammer union, may then be connected to the adapter ring and locked in place. In another embodiment, the flange member is axially secured to the ball valve housing by ball locking members.

The present invention allows for a standard two piece ball valve with a female acme outlet connection, such that the distance from the acme threads of the connection to the surface of the ball on the closed ball valve is minimized for the purpose of minimizing the release of trapped fluid at disconnect.

These and further features and advantages of the present invention will become apparent from the following detailed description, wherein reference is made to the figures in the accompanying drawings.

DETAILED DESCRIPTION OF PREFERRED EMBODIMENTS

Figure 1:
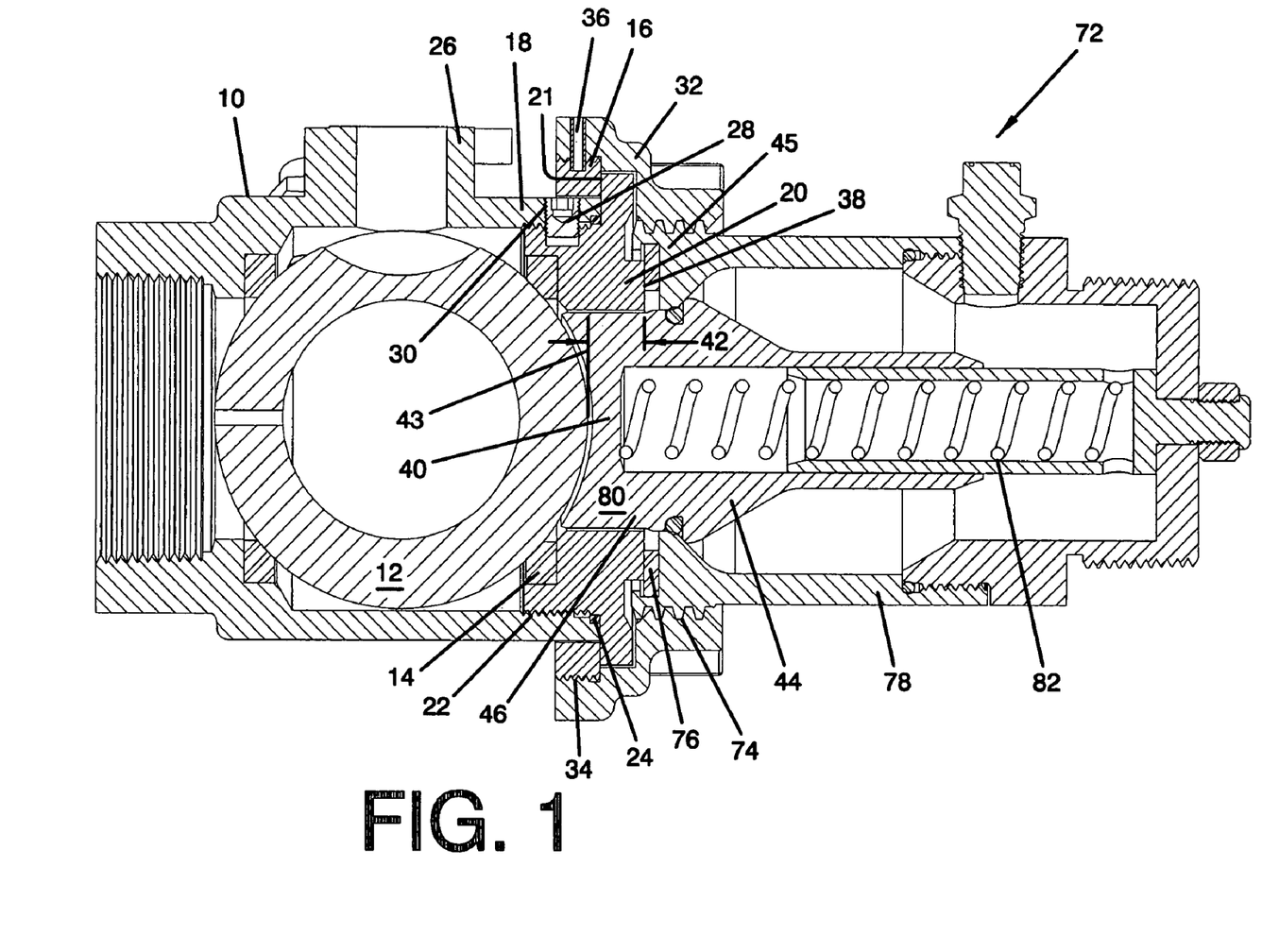
FIG. 1 is a cross-sectional view of the female acme adapted ball valve connected to a downstream check valve for minimizing the total release of fluid at disconnect.
Figure 2:
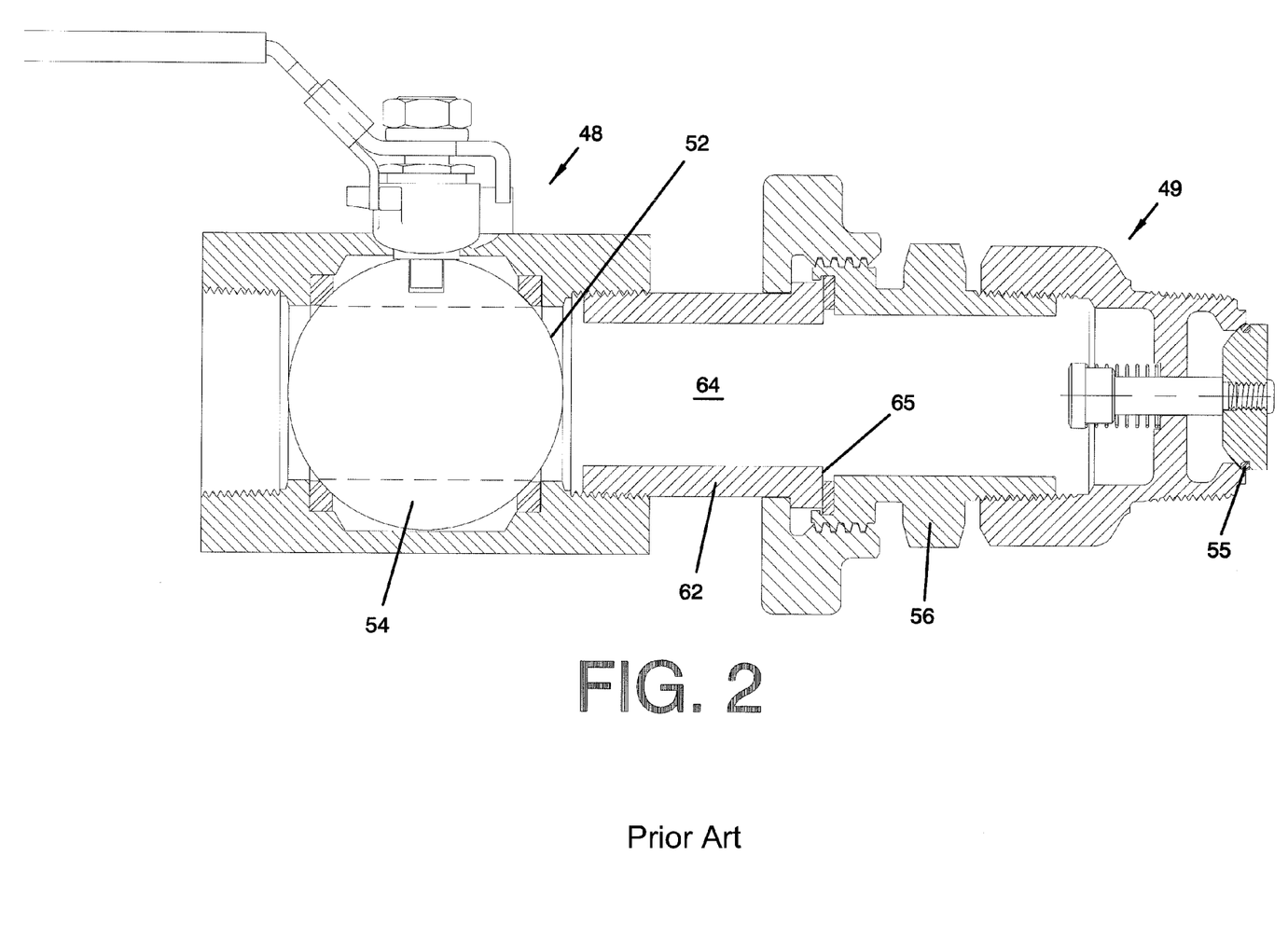
FIG. 2 is a cross-sectional view of a standard ball valve and downstream check valve outfitted with industry standard female and male acme adapters.

FIG. 1 illustrates a ball valve assembly comprising a ball valve body or housing 10, a ball 12 and ball seals 14. The handle, stem and stem seal system are not shown, and may be of the type standard to the industry. A suitable handle and stem are shown in FIG. 2. Threaded stop ring 16 is placed over the body outlet end 18 and then flange member 20 is threaded to body 10 at thread 22, forming a pressure seal with o-ring 24. Stop ring 16 is slipped toward valve body stem hub 26 to provide clearance for making up a connection using pin member 28. Locking pin 28 locks body 10 to flange member 20 and provides a pressure seal with body 10 at threads 30, so that pin 28 clears the inner diameter of threaded stop ring 16.

Female acme union 32 is then threadedly connected to stop ring 16 at thread 34 and locked in place with one or more locking pins 36. This arrangement provides for a minimal distance 42 between the face 43 of closed ball valve 12 and the seal face 38 on the flange member 20, defining a volume 40 therebetween, which preferably is between 0.9 and 1.6 cubic inches on a system using a 2 inch ball valve and a 3¼ inch acme which is the most common combination.

FIG. 1 further shows a downstream check valve 72 adapted with a male acme 45 and a poppet member 44 which has a nose 46 formed on an end of the poppet member to occupy most of volume 40 when the ball valve is closed, therefore providing a minimal release of product at disconnect.

FIG. 2 shows a prior art upstream ball valve 48 and a standard downstream check valve 49 outfitted with industry standard female and male acme adapters to facilitate connection. This arrangement would allow the release of from 18.0 to 22.0 cubic inches of product at disconnect, since the released fluid occupied the entire volume from the face 52 of the closed ball 54 to the check valve seal 55. The male acme adaptor 56 threaded to the check valve 49 could be designed to reduce this volume. The ball valve and female acme connection may be revised to shorten member 62 and thereby reduce volume 64 between the face 52 of the closed ball valve and seal face 65 of the acme adapter. The present invention provides for a much greater reduction in volume 64 than would be possible by simply shortening member 62.

The method of assembling the ball valve as shown in claim 1 is significant to the present invention. The first operation involves placing the stop ring 16 over the outlet of housing 18, and pushing the stop ring toward the valve stem so that the flange member 20 may be threaded to the valve body, then the threaded pin inserted to connect the valve body and the flange member. Stop ring 16 may then be positioned against the retaining surface 21 on a flange member 20, and the coupling 32 then threaded to the stop ring 16 and pin 36 inserted to fixedly connect the stop ring and the coupling. Seals 14 held in place by the flange member maintain reliable sealing engagement with the ball 12. A suitable separable component, such as check valve 72 with male threads 74, may then be threaded to the coupling 32, with seal 76 providing a fluid tight connection between the flange member and the body 78 of the check valve. The check valve includes a stem end member 80 which occupies most of the volume 40 when the check valve is closed, with that member being biased toward the closed position by coil spring 82. Other suitable components may be provided separate from a check valve, although the check valve as disclosed herein satisfies the desire to minimize the volume of released material when the connection is broken.

Although the flange member 20 may have various configurations, a stop surface projecting outward from the valve body is provided for engagement with the stop ring. The flange member is preferably ring shaped to maintain strong structural integrity of the connection, and the stop ring 16 is also preferably ring shaped. Further details regarding a suitable check valve are disclosed in U.S. Pat. No. 6,155,295.

As discussed above, flange member 20 supports seal 14 for sealing with the ball, and a separate seal 76 is provided for sealing between the flange member and the separable component 72. Flange member 20 also has a circular interior diameter for closely receiving the stem head of a separable component which may rest in close proximity to the face of the ball when the stem head is in the closed position.

Figure 3:
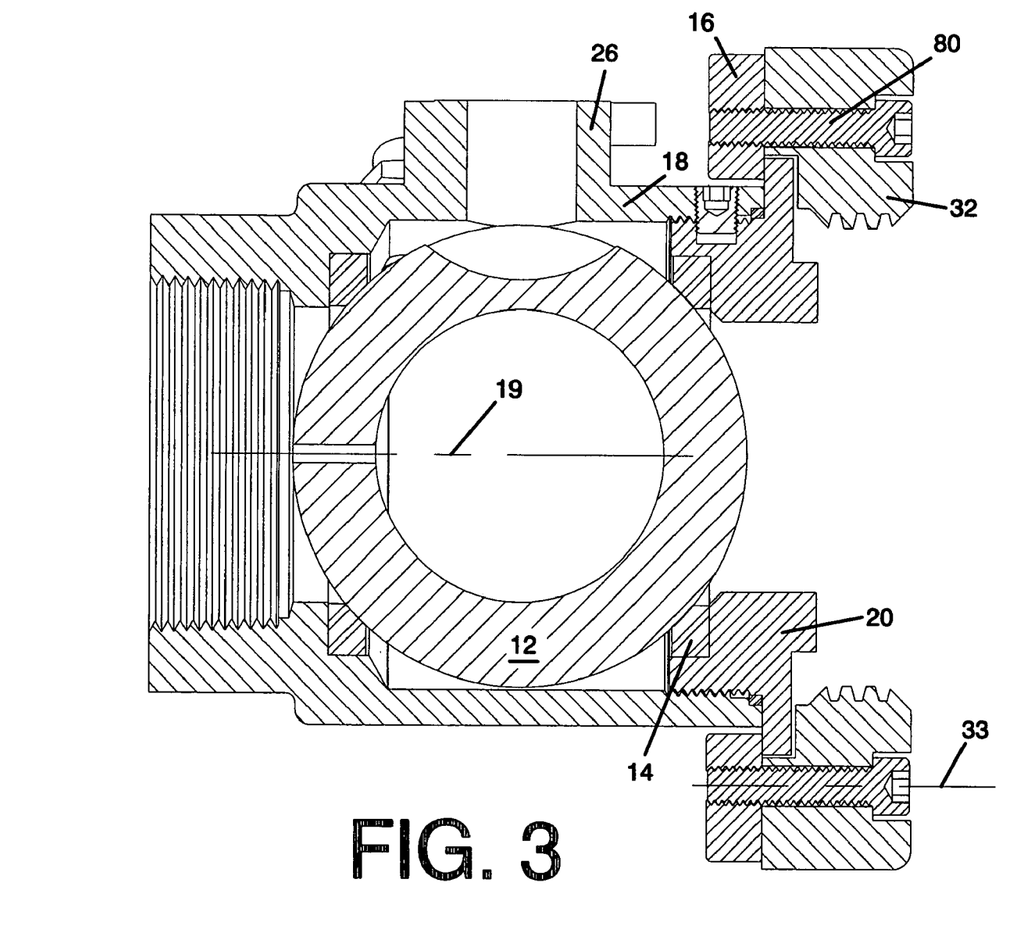
FIG. 3 is a cross-sectional view of another embodiment of the invention with the coupling bolted to the stop ring.

In FIG. 3 embodiment, a modified flange member 20 is used, and the union or coupling 32 is secured to stop ring 16 with multiple bolts 80 each having an axis 33 substantially parallel to the central axis 19 of the housing 18. Since the union is typically tightened by striking it with a small hammer, and since the valve may be used for propane service, the union is preferably made of non-sparking material, such as brass. This design has a larger female union than the FIG. 1 embodiment which increases the weight and therefore the cost of the union. Moreover, the strength of the connection is a function of the strength of the attachment bolts 80, which are necessarily small relative to other threads in the connection.

Figure 4:
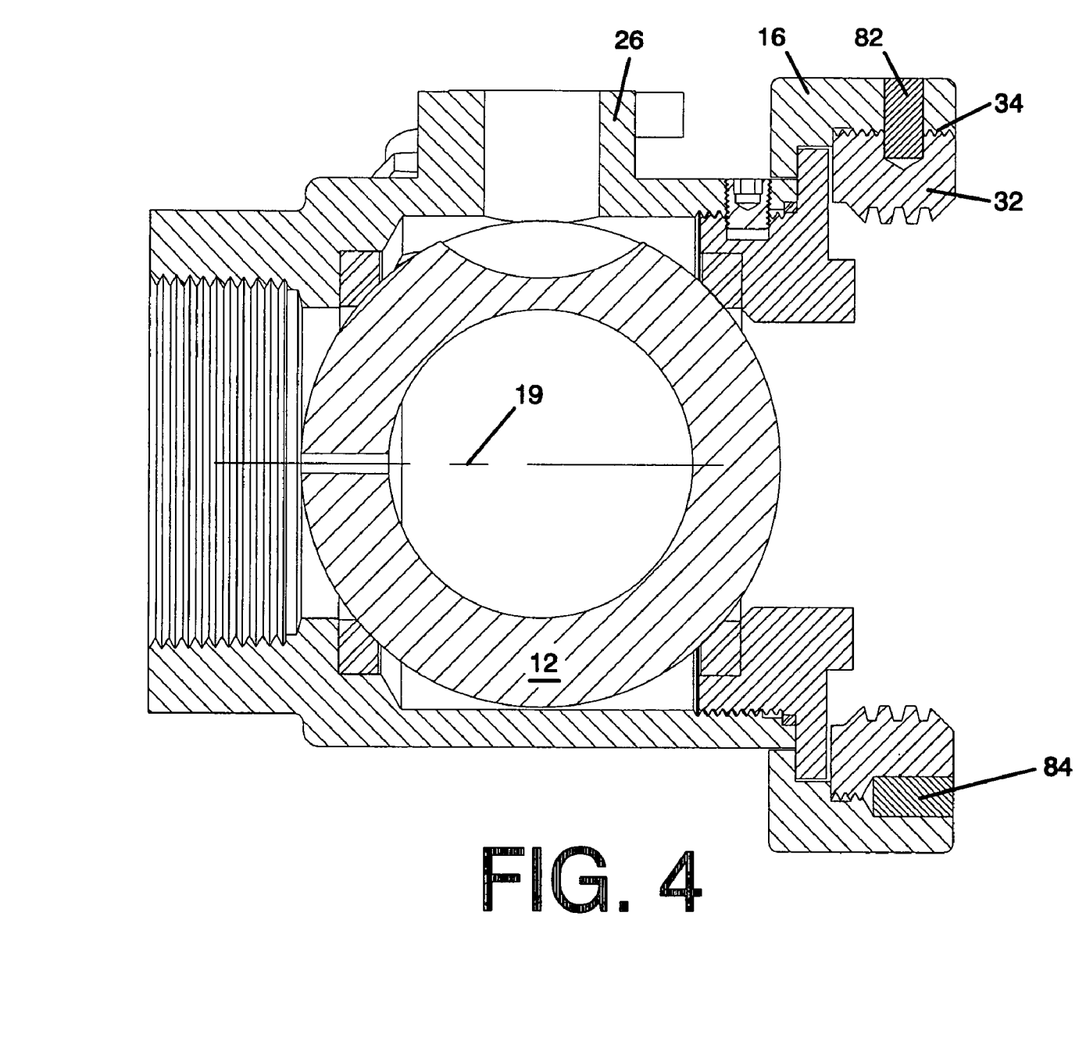
FIG. 4 is another embodiment of the invention wherein the coupling is threaded and pinned to the stop ring.

FIG. 4 illustrates another embodiment, wherein the union member 32 is connected to the modified stop ring 16 by threads 34. In this case, threads 34 are as strong as the other threads in the connection. Lock pin 82 may be installed to lock the stop ring 16 to the coupling 32, and the coupling is only slightly larger than the FIG. 1 embodiment. Lock pin 82 may be installed either radially through thread 34 (perpendicular to axis 19) or parallel with the axis 19 as shown in FIG. 4 with pin 84.

Figure 5:
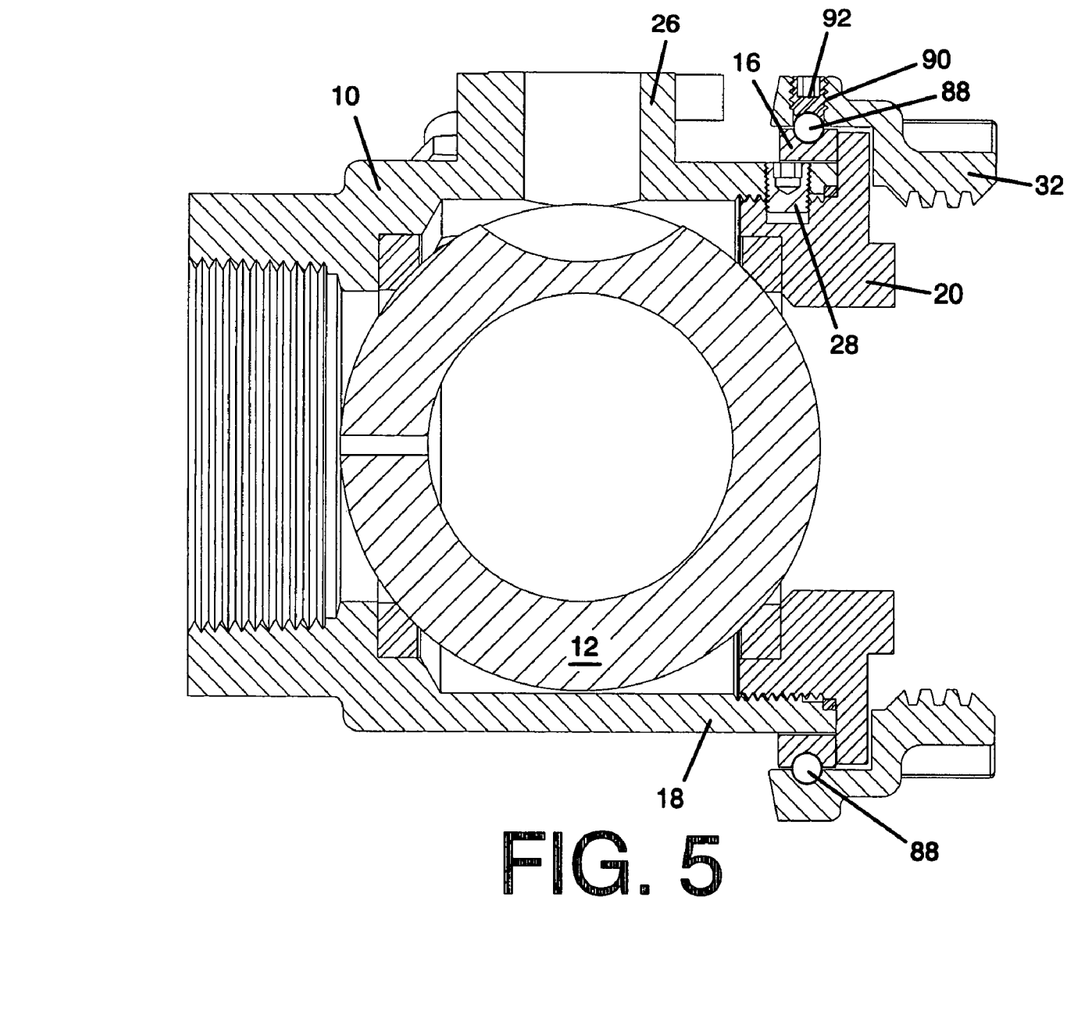
FIG. 5 is yet another embodiment of the invention, wherein locking balls axially interconnect the stop ring and the coupling.

FIG. 5 is yet another embodiment in which the stop ring 16 is placed on body or housing 10, then the flange member 20 threaded to body 18 and locked in place with a threaded lock member 28. Stop ring 16 and coupling 32 both have one-half of a ball race with a circular cross-section machined therein. Coupling 32 and stop ring 16 are placed so that the ball races are aligned, so that multiple ball lock members 88 may be fed into the race through threaded port 90 and then retained with threaded plug 92. Stop ring 16 is retained by flange 20, and the union 32 is free to swivel about the axis of the ball valve. The ball members axially connect the stop ring and the coupling, such that tightening the coupling on a male threaded component forces the stop ring into secured engagement with the flange member. Wear between the flange member 20 and the stop ring 16 during rotation of coupling 32 is substantially eliminated by the presence of the ball members 88, which provide a substantially frictionless thrust surface as the union 32 is tightened to the male member. This embodiment is lightweight and robust, and the locking balls provide significantly reduced wear and low operational friction. In the event that debris prevents the ball members 88 from circulating in the ball race, the unit will still function until the ball race is cleaned because the stop member 16 will simply slide and thrust against flange member 20.

Figure 6:
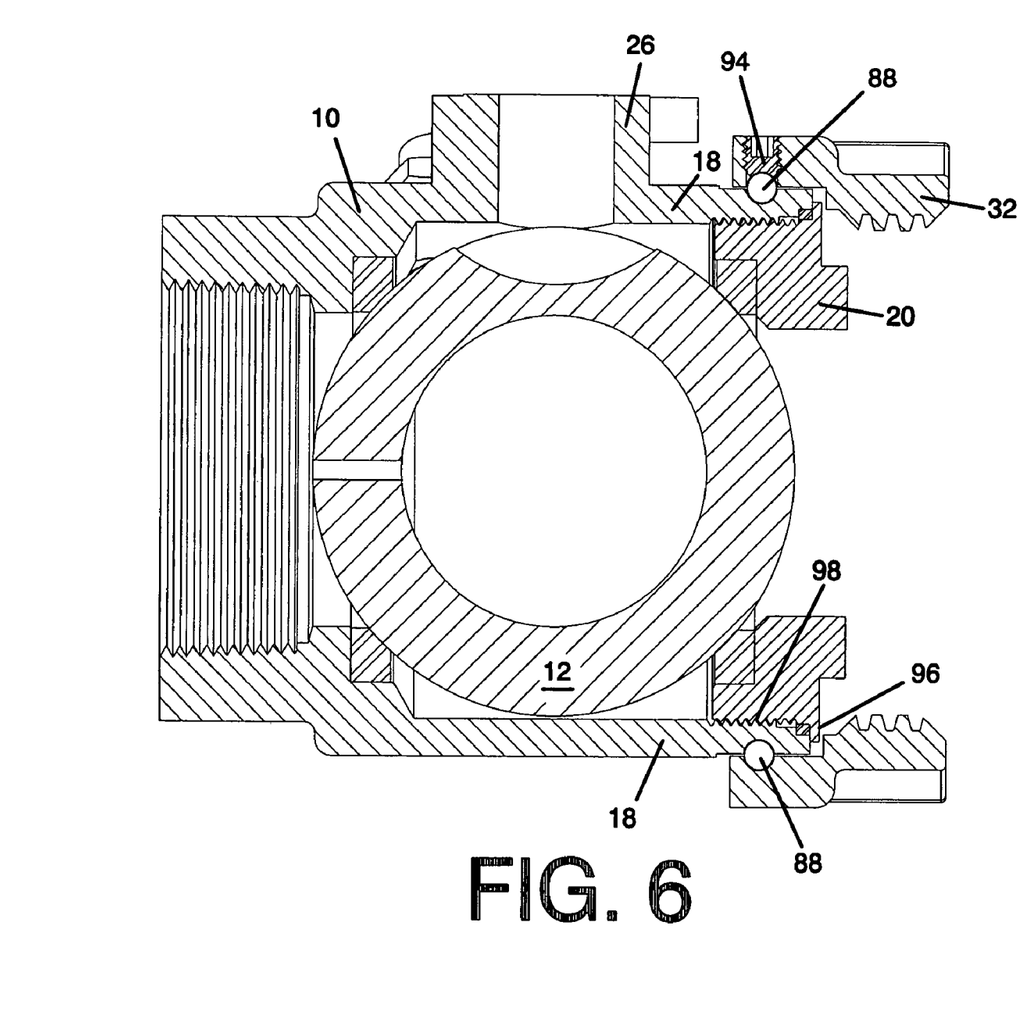
FIG. 6 is another embodiment of the invention, wherein locking balls axially interconnect the coupling and the ball valve housing.

In the FIG. 6 embodiment, locking ball members directly engage the valve body 10, being positioned in a race in the valve body and in the coupling 32. Ball locking members 88 may be fed through a port in the coupling and maintained in place by a threaded plug 94. The coupling may be assembled close to the ball face since the flange portion 96 which engages an end surface on the valve body may have a minimal thickness. This proposal avoids the use of a stop ring, since the coupling is rotationally locked to the valve body by the locking balls. In the event of debris preventing circulation of ball locking members 88 the unit will be rendered inoperable until it is cleaned therefore this is a less than optimal solution. The cross section of the valve body between its flange engaging threads 98 and the deep portion of the ball race in the valve body is relatively thin, which weakens the connection. To overcome this problem, the thickness of at least the downstream end of the valve body outlet end adjacent the threads 98 may be increased to compensate for the reduction in thickness due to the ball race in the external surface of the valve body.

Figure 7:
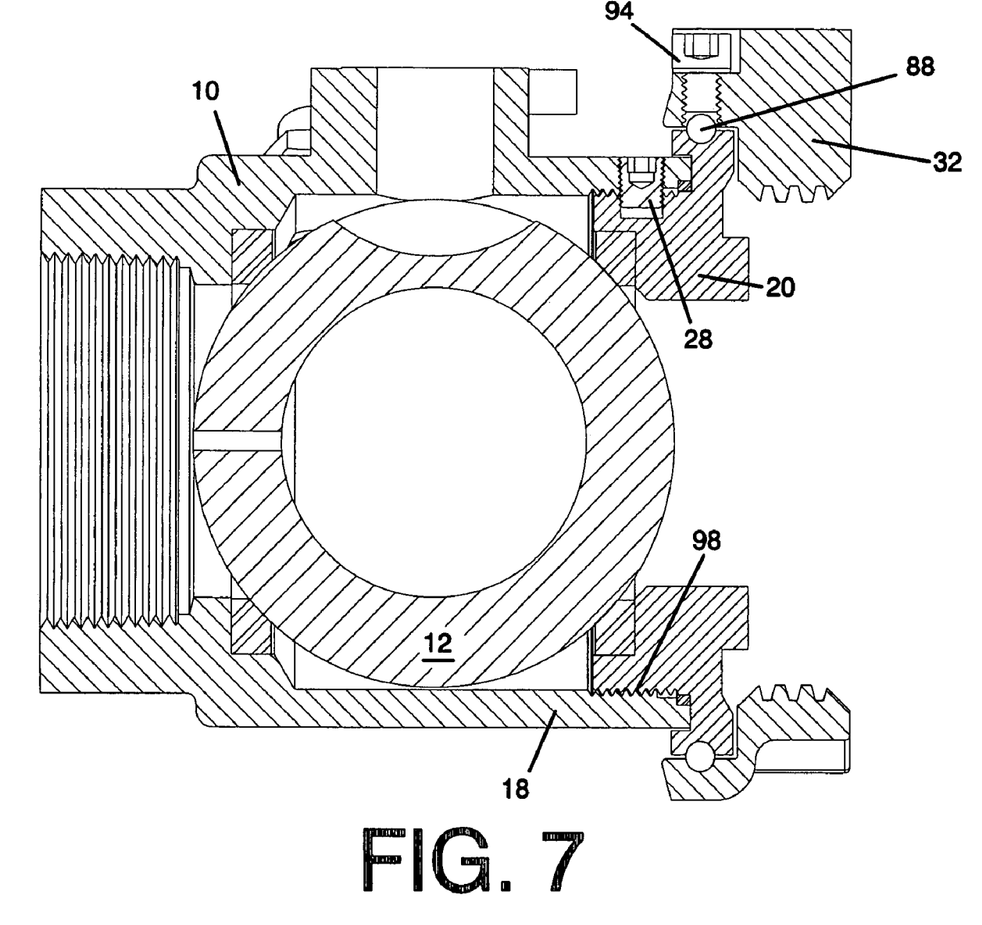
FIG. 7 illustrates another embodiment of the invention, wherein the flange member and the coupling are axially connected.

FIG. 7 depicts yet another embodiment of the invention wherein a radially outward portion of flange 20 is secured to the coupling 32 by a plurality of locking balls 88 fed through a port in the flange and held in place by the threaded pin member 94. Flange member 20 is preferably threaded to the valve body at threads 98, and is rotationally secured to the valve body by pin 28.

This embodiment has the advantage of eliminating the stop ring of FIG. 5 which would reduce cost. However, as in both the FIGS. 6 and 7 embodiments, if debris jams up the ball race, then the assembly is effectively out of commission until the race is clean.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A ball valve for threaded connection to a check valve having a male thread and a stem head configured for mating with a surface of a ball when the check valve is closed, comprising:
   a valve housing having a first fluid end and a second component receiving end, the valve housing containing the ball rotatable for selectively passing fluid through the valve housing and between the first fluid end and the second component receiving end;
   a valve body stem hub secured to the valve housing for receiving a stem to rotate the ball;
   a flange member secured to and extending radially outward from the valve housing and including a stop surface thereon positioned radially outward of the valve housing and supporting a first seal for sealing with the ball, the stop surface being positioned between an outer surface of the ball and a second seal positioned between the flange member and the check valve;
   a stop ring positioned outward of the valve housing and engageable with the stop surface on the flange member; and
   a coupling axially connected to the stop ring, the coupling rotatable with respect to the valve housing and the flange member, the coupling including female threads for engagement with the male threads on the check valve, the coupling female threads having a thread diameter less than a minimum diameter of the stop surface, such that rotation of the coupling onto the check valve forces the stop ring into engagement with the stop surface, the coupling female threads being opposite the stop ring with respect to the stop surface.

2. A ball valve as defined in claim 1, wherein the coupling is threadably connected to the stop ring.

3. A ball valve as defined in claim 2, wherein the coupling is pinned with respect to the stop ring.

4. A ball valve as defined in claim 1, wherein the flange member is threadably connected to the valve housing.

5. A ball valve as defined in claim 1, wherein the stop ring and the coupling are axially connected by a plurality of ball locking members positioned within a race in the stop ring and the coupling.

6. A ball valve for threaded connection to a check valve having a male thread and a stem head configured for mating with a surface of a ball when the check valve is closed, comprising:
   a valve housing having a first fluid end and a second component receiving end, the valve housing containing the ball selectively rotatable for passing fluid through the valve housing;
   a valve body stem hub secured to the valve housing for receiving a stem to rotate the ball;
   a flange member threadably secured to the valve housing and including a stop surface thereon positioned radially outward of the valve housing;
   a stop ring positioned outward of the valve housing and engageable with the stop surface on the flange member; and
   a coupling axially connected to the stop ring, the coupling rotatable with respect to the valve housing and the flange member, the coupling including female threads for engagement with the male threads on the check valve, such that rotation of the coupling onto the check valve forces the stop ring into engagement with the stop surface, the coupling female threads having a thread diameter less than a minimum diameter of the stop surface, and the stop ring rotates with the coupling with respect to the valve housing.

7. A ball valve as defined in claim 6, wherein the stop ring and the coupling are axially connected by a plurality of ball locking members positioned within a race in the stop ring and the coupling.

8. A ball valve as defined in claim 6, wherein the stop ring is threaded to the coupling.

9. A ball valve as defined in claim 6, wherein the stop ring is connected to the coupling by one of a bolt and a pin.

10. A ball valve as defined in claim 6, wherein the flange member supports a first seal for sealing with the ball; and
   a second seal between the flange member and the check valve and the stop surface is positioned between an outer surface of the ball and the second seal between the flange member and the check valve.

11. A ball valve as defined in claim 6, wherein
   the flange member is threadably connected to the valve housing; and
   the flange member is pinned with respect to the valve housing.

12. A ball valve for threaded connection to a check valve having a male thread and a stem head configured for mating with a surface of a ball when the check valve is closed, comprising:
   a ball valve housing containing the ball rotatable by a stem passing through the ball valve housing;
   a valve body stem hub secured to the ball valve housing for receiving the stem to rotate the ball;
   a flange member secured to and extending outward from the ball valve housing and supporting a seal for sealing with the ball;
   a stop ring positioned outward of the ball valve housing and engageable with a stop surface on the flange member;
   a coupling axially secured to the ball valve housing, the coupling being rotatable with respect to the ball valve housing, the coupling including female threads for engagement with the male threads on the check valve, the coupling female threads having a thread diameter less than a minimum diameter of the stop surface, such that rotation of the coupling onto the check valve forces the stop ring into engagement with the stop surface; and
   a seal between the flange member and the check valve.

13. A ball valve as defined in claim 12, wherein the stop ring and the coupling are axially connected by a plurality of ball locking members positioned within a race in the stop ring and the coupling.

14. A ball valve as defined in claim 12, wherein the stop ring rotates with the coupling with respect to the ball valve housing.

15. A ball valve as defined in claim 12, wherein the stop surface is positioned between an outer surface of the ball and the seal between the flange member and the check valve.

* * * * *